2,760,958
Patented Aug. 28, 1956

2,760,958

DISAZO DYESTUFFS

Werner Bossard, Riehen, near Basel, Switzerland, and Paul Dussy, St. Louis, France, assignors to J. R. Geigy A.-G., Basel, Switzerland, a Swiss firm No Drawing. Application December 7, 1954, Serial No. 473,722

Claims priority, application Switzerland December 9, 1953

9 Claims. (Cl. 260—175)

The present invention concerns new disazo dyestuffs which are distinguished by their very pure orange to red shades on cellulose fibres, the direct cellulose dyeings of which have, relatively, a very good fastness to light. It further concerns processes for the production of these disazo dyestuffs as well as their use for the dyeing of cellulose material and also the material dyed in pure shades with the help of these dyestuffs.

It has been found that new, very pure and substantive disazo dyestuffs are obtained if 1 mol of 5.5'-dihydroxy-2.2'-dinaphthyl urea-7.7'-disulphonic acid is coupled in steps in any order desired with the equimolecular amount of a diazotised amino compound of the general Formula I:

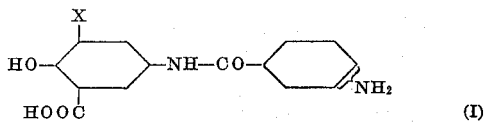

and with the equimolecular amount of a diazotised amino-aryl sulphonic acid of the benzene or naphthalene series. In the above formula X represents hydrogen, halogen, an alkyl or a sulphonic acid group and the benzoyl radical may contain further non-ionogenic substituents but, however, no groups capable of forming a metal complex.

The amino compounds of the general Formula I usable in the process according to the present invention are obtained from 5-amino-2-hydroxybenzene-1-carboxylic acids which may be further substituted in the 3-position of the benzene ring by halogen, an alkyl or a sulphonic acid group, by acylating with an m- or p-nitrobenzoyl halide which can contain further non-ionogenic substituents such as, e. g. halogen or alkyl groups but, however, no groups capable of forming a metal complex, and then reducing the nitro group to the amino group. The disazo dyestuffs according to the present invention derived from p-aminobenzoyl compounds of the general Formula I have, in general, a better affinity to cellulose and are to be preferred for this reason. The amines of the general Formula I are diazotised for example by the indirect method in cold mineral acid by the dropwise addition of the aqueous solution of the alkali salts containing sodium nitrite.

Other diazo components which can be used in the process according to the present invention are aminobenzene and aminonaphthalene sulphonic acids, both the mono- as well as the poly-sulphonic acids, e. g. 2-, 3- or 4-aminobenzene-1-sulphonic acid, 5-amino-2-methylbenzene-1-sulphonic acid, 1-amino-4-methoxybenzene-2-sulphonic acid, 1-amino-4-ethoxybenzene-2-sulphonic acid, 1-amino-2.4-dichlorobenzene-6-sulphonic acid, 1-amino-2.4-dimethylbenzene-6-sulphonic acid, 1-aminobenzene-2.4- or -2.5-disulphonic acid, 1-aminonaphthalene-3-, -4-, -5-, -6-, -7- or -8-sulphonic acid, 1-aminonaphthalene-3.6- or -3.8-disulphonic acid, 2-aminonaphthalene-5-, -6-, -7-, or -8- sulphonic acid, 2-aminonaphthalene-3.6- or -4.8- or -5.7- or -6.8-disulphonic acid, 1-aminonaphthalene-3.6.8-trisulphonic acid, 2-aminonaphthalene-1.5.7-trisulphonic acid. Because of the more favourable properties of the disazo dyestuffs obtained according to the present invention, disulphonic acids are to be prepared to the monosulphonic acids. Naphthalene sulphonic acids produce the more valuable redder shades and the disazo dyestuffs according to this invention which are derived from 2-aminonaphthalene disulphonic acids are, in general, more fast to light than those derived from 1-aminonaphthalene sulphonic acids and are, therefore, to be preferred. The amino aryl sulphonic acids are diazotised by methods known per se with alkali nitrite in mineral acid aqueous solution or suspension in the cold.

The 5.5'-dihydroxy-2.2'-dinaphthyl urea-7.7'-disulphonic acid can be coupled advantageously in alkaline, neutral to acid solution of its alkali salts in the cold. Often it is of advantage first to react the diazotised aminoaryl sulphonic acid in the presence of alkali acetates and then react the diazo compound corresponding to the general Formula I in the presence of alkali carbonates or bicarbonates. The disazo dyestuffs formed are isolated by known methods by precipitation with sodium chloride, filtration and drying.

In the form of their alkali salts which dissolve well in water, the new disazo dyestuffs are red to dark redbrown powders according to the composition. They dissolve in water with an orange to red shade and dye cellulose material from a dyebath containing Glauber's salt in very pure similar shades. Particularly valuable disazo dyestuffs are obtained from diazotised amino compounds of the general Formula II

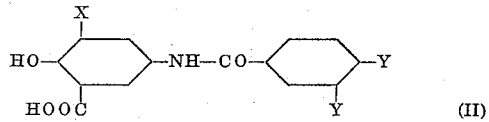

wherein one Y represents the primary amino group, the other Y represents hydrogen or the methyl group and X has the meaning given in Formula I. The disazo dyestuffs according to the present invention can also be treated with agents giving off metal, e. g. with agents giving off chromium or copper. The treatment is performed preferably on the fibre so that the wet fastness properties of the direct cellulose dyeings can be even further improved. However, the metallisation causes an undesirable dullness of the shades so that non-metallised cellulose dyeings are to be preferred.

The following examples illustrate the invention without limiting it in any way. Where not otherwise stated, the parts are given as parts by weight. The temperatures are in degrees centigrade.

*Example 1*

30.3 parts of 2-naphthylamine disulphonic acid-(6.8) are dissolved at 70°–80° in 320 parts of water and the amount of sodium carbonate necessary to make the reaction neutral. After cooling to room temperature, 6.9 parts of sodium nitrite and 30 parts of a 30% hydrochloric acid are added. The diazo solution so prepared is poured into a 20° warm solution of 50.4 parts of the symmetrical urea of 2-amino-5-hydroxynaphthalene sulphonic acid-(7) and 16 parts of sodium acetate in 800 parts of water. After 4–6 hours, the unilateral coupling is complete. The dyestuff solution is heated to 40–45°, neutralised by the addition of 8.3 parts of sodium carbonate and 40 parts of sodium carbonate are added.

29.1 parts of 5-(3'-methyl-4'-aminobenzoylamino)-2-hydroxybenzene-1-carboxylic acid are dissolved in the warm in 350 parts of water with the addition of 4 parts of caustic soda. After the addition of 7.2 parts of sodium nitrite, the solution is cooled and stirred at room temperature into a mixture of 45 parts of 30% hydrochloric acid and 100 parts of water. The yellow diazo compound precipitates and, after 2 hours, it is coupled with the monoazo solution described above. After stirring for a considerable time at 40–45°, the coupling is complete. The dyestuff is precipitated hot with a little salt, and filtered off at room temperature. The dried dyestuff of the formula:

mation of the monoazo dyestuff is completed after 4–6 hours whereupon the solution is heated to 40–45°, neutralised with 8.3 parts of sodium carbonate and 40 parts of sodium bicarbonate are added.

7.2 parts of sodium nitrite are added at room temperature to a solution cooled to 20° of 27.8 parts of 5-(4-aminobenzoylamino)-2-hydroxybenzene-1-carboxylic acid which have been dissolved by warming in 400 parts of water with the addition of 4 parts of caustic soda. The whole is then

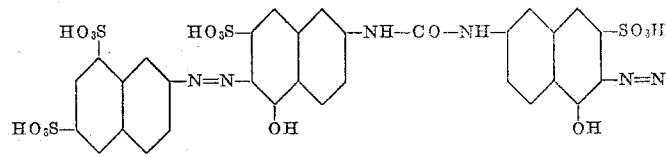
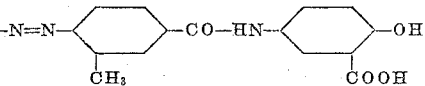

is a brown-red powder which dissolves in water with a yellowish-red and in concentrated sulphuric acid with a violet colour. It dyes cellulose fibers in pure bluish scarlet shades which have very good fastness to light, alkali and acid.

If in the above example, 29.1 parts of 5-(3'-methyl-4'-aminobenzoylamino-2-hydroxybenzene-1-carboxylic acid are replaced by the number of parts of a diazo component added dropwise to a mixture of 45 parts of 30% hydrochloric acid and 100 parts of water. The diazotisation is complete in 1½ to 2 hours whereupon the yellow diazo suspension is stirred into the monoazo dyestuff solution described above. After 10 hours, the diaso dyestuff is precipitated hot with a little salt, filtered off and dried. It is a bordeaux red powder which dissolves in water with a yellowish-red and in concentrated sulphuric acid with a violet colour. The dyestuff of the formula

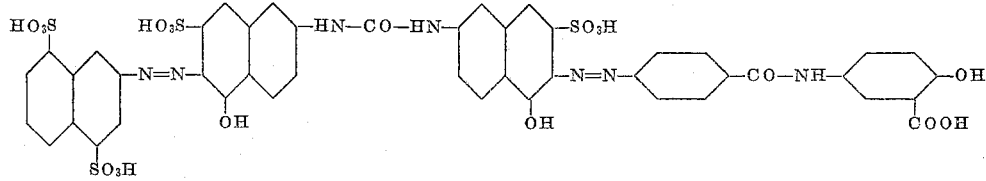

given in the table below, dyestuffs with the following properties are obtained.

dyes fibres of natural or regenerated cellulose in scarlet red shades which have really good fastness to light.

If in the above example, the 30.3 parts of 2-naphthylamino-4.8-disulphonic acid are replaced by the number of parts of a naphthylamine mono-, di- or tri-sulphonic acid given in the table below, then dyestuffs with the following properties are obtained.

| Dyestuff No. | No. of parts by weight | Diazo component coupled with the monoazo dyestuff from 30.3 parts of 2-naphthylamine-6.8-disulphonic acid and 50.4 parts of J-acid urea | Resulting dyestuff: P=colour of powder; S= shade of cellulose dyeing |
|---|---|---|---|
| 1 | 27.8 | 5-(4'-aminobenzoylamino)-2-hydroxybenzene-1-carboxylic acid. | P=bordeaux; S=scarlet. |
| 2 | 27.8 | 5-(3'-aminobenzoylamino)-2-hydroxybenzene-1-carboxylic acid. | P=brown red; S=scarlet. |
| 3 | 29.1 | 5-(4'-methyl-3'-aminobenzoylamino)-2-hydroxybenzene-1-carboxylic acid. | P=red-brown; S=brill. red. |
| 4 | 31.2 | 5-(4'-chloro-3'-aminobenzoylamino)-2-hydroxybenzene-1-carboxylic acid. | P=brown; S=red. |
| 5 | 35.9 | 5-(4'-aminobenzoylamino)-2-hydroxybenzene-1-carboxylic acid-3-sulphonic acid. | P=red; S=scarlet. |
| 6 | 31.2 | 5-(3'-aminobenzoylamino)-2-hydroxy-3-chlorobenzene-1-carboxylic acid. | P=brown; S=red. |
| 7 | 29.1 | 5-(4'-aminobenzoylamino)-2-hydroxy-3-methyl-benzene-1-carboxylic acid. | P=brown; S=scarlet. |
| 8 | 30.6 | 5-(3'-methyl-4'-aminobenzoylamino)-2-hydroxy-3-methylbenzene-1-carboxylic acid. | P=red; S=brill. red. |
| 9 | 31.2 | 5-(2'-chloro-5'-aminobenzoylamino)-2-hydroxybenzene-1-carboxylic acid. | P=brown red; S=red. |
| 10 | 31.2 | 5-2'-chloro-5'-aminobenzoylamino)-2-hydroxybenzene-1-carboxylic acid-3-sulphonic acid. | P=bordeaux; S=red. |
| 11 | 36.2 | 5-(2',4'-dichloro-5'-aminobenzoylamino)-2-hydroxy-3-methylbenzene-1-carboxylic acid. | P=brown; S=red. |
| 12 | 32.6 | 5-(3'-methyl-4'-aminobenzoylamino)-2-hydroxy-3-chlorobenzene-1-carboxylic acid. | P=brown-red; S=red. |

*Example 2*

30.3 parts of 2-naphthylamine-4.8-disulphonic acid in 350 parts of water are diazotised at room temperature with 6.9 parts of sodium nitrite and 30 parts of 30% hydrochloric acid. The diazo suspension so obtained is added to a solution of 50.4 parts of the symmetrical urea of 2-amino-5-hydroxynaphthalene-7-sulphonic acid and 16 parts of sodium acetate in 800 parts of water. The for-

| Dyestuff No. | No. of parts by weight | Diazo component coupled with 50.4 parts of the symmetrical urea of 2-amino-5-hydroxynaphathalene-7-sulphonic acid and with 27.8 parts of 5-(4'-aminobenzoyl-amino)-2-hydroxybenzene-1-carboxylic acid | Resulting dyestuff: P= colour of powder; S= shade of Dyeing on Cotton |
|---|---|---|---|
| 1 | 22.3 | 1-aminonaphthalene-6-sulphonic acid. | P=red; S=scarlet. |
| 2 | 23.3 | 1-aminonaphthalene-7-sulphonic acid. | P=orange-red; S=scarlet. |
| 3 | 22.3 | 2-aminonaphthalene-1-sulphonic acid. | P=brown red; S=orange red. |
| 4 | 22.3 | 2-aminonaphthalene-6-sulphonic acid. | P=red; S=orange red. |
| 5 | 22.3 | 2-aminonaphthalene-8-sulphonic acid. | P=red; S=orange red. |
| 6 | 30.3 | 1-aminonaphthalene-3.6-disulphonic acid. | P=red brown; S=scarlet. |
| 7 | 30.3 | 1-aminonapthalene-4.7-disulphonic acid. | P=brown-violet; S=scarlet. |
| 8 | 30.3 | 2-aminonaphthalene-5.7-disulphonic acid. | P=brown red; S=scarlet. |
| 9 | 30.3 | 2-aminonaphthalene-3.6-disulphonic acid. | P=bordeaux; S=scarlet. |
| 10 | 38.3 | 1-aminonaphthalene-3.6.8-trisulphonic acid. | P=brown-violet; S=red. |
| 11 | 38.3 | 2-aminonaphthalene-1.5.7-trisulphonic acid. | P=brown-violet; S=red. |

If in Example 2, 27.8 parts of 5-(4'-aminobenzoylamino)-2-hydroxybenzene-1-carboxylic acid are replaced by the number of parts of a diazo component given in the table below, then dyestuffs with the following properties are obtained.

| Dyestuff No. | No. of parts by weight | Diazo component coupled with the monoazo dyestuff from 30.3 parts of 2-naphthylamine-4.8-disulphonic acid and 50.4 parts of J-acid urea | Resulting dyestuff: P=colour of powder; S=shade of cellulose dyeing |
|---|---|---|---|
| 1 | 29.1 | 5 - (3' - methyl - 4' - aminobenzoylamino) - 2 - hydroxybenzene - 1 - carboxylic acid. | P=brown red; S=scarlet. |
| 2 | 27.8 | 5 - (3' - aminobenzoylamino) - 2 - hydroxybenzene - 1 - carboxylic acid. | P=brown red; S=scarlet. |
| 3 | 35.9 | 5 - (4' - aminobenzoylamino) - 2 - hydroxybenzene - 1 - carboxylic acid - 3 - sulphonic acid. | P=red; S=scarlet. |
| 4 | 29.1 | 5 - (4' - aminobenzoylamino) - 2 - hydroxy - 3 - methylbenzene - 1 - carboxylic acid. | P=red brown; S=red. |
| 5 | 30.6 | 5 - (3' - methyl - 4' - aminobenzoylamino) - 2 - hydroxy - 3 - methylbenzene - 1 - carboxylic acid. | P=red; S=brilliant red. |

*Example 3*

27.2 parts of 5-(4'-aminobenzoylamino)-2-hydroxybenzene-1-carboxylic acid are dissolved at 60–70° in 400 parts of water with 4 parts of caustic soda and the solution is cooled to room temperature. 6.9 parts of sodium nitrite are added to the solution and the whole is added dropwise at 20–25° to a mixture of 45 parts of 30% hydrochloric acid and 100 parts of water. The diazotisation is complete after 2 hours. The yellow diazo suspension is added at 20–25° to a solution of 50.4 parts of 5.5'-dihydroxy-2.2'-dinaphthyl urea-7.7'-disulphonic acid and 16 parts of sodium acetate in 800 parts of water. After 4–6 hours the unilateral coupling is complete whereupon the dyestuff solution is heated to 40–45°, neutralised with 7.5 parts of sodium carbonate and 40 parts of sodium bicarbonate are added.

20.5 parts of 1-amino-2.4-dimethylbenzene-6-sulphonic acid are diazotised at 0–5° with 7.0 parts of sodium nitrite in 300 parts of water by the quick addition of 200 parts of 30% hydrochloric acid. After 1 hour, the diazo suspension so obtained is stirred into the monoazo solution above described. After 10–12 hours, the disazo dyestuff is heated to 80–85°, precipitated with salt, filtered off and dried at 80°. It is a red powder which dissolves in water with an orange and in concentrated sulphuric acid with a blue-violet colour. The dyestuff of the formula:

dyes cellulose fibres in pure orange-red shades which have good fastness to light and alkali.

If in the above example 20.5 parts of 1-amino-2.4-dimethylbenzene-6-sulphonic acid are replaced by the number of parts of an aminobenzene-mono- or di-sulphonic acid given in the table below, then dyestuffs with the following properties are obtained.

| Dyestuff No. | No. of parts by weight | Diazo component coupled with the monoazo dyestuff from 27.2 parts of 5-(4'-aminobenzoylamino)-2-hydroxybenzene-1-carboxylic acid and 50.4 parts of the symmetrical urea of 2-amino-5-hydroxynaphthalene-7-sulphonic acid | Resulting dyestuff; P=colour of powder; S=shade of cellulose dyeing |
|---|---|---|---|
| 1 | 24.7 | 1-amino-2.4-dichlorobenzene-6-sulphonic acid. | P=red; S=red. |
| 2 | 17.6 | 1-aminobenzene-2-sulphonic acid. | P=red; S=orange. |
| 3 | 17.6 | 1-aminobenzene-4-sulphonic acid. | P=red; S=orange. |
| 4 | 20.7 | 1-amino-4-methoxybenzene-2-sulphonic acid. | P=blue red; S=scarlet. |
| 5 | 22.1 | 1-amino-4-ethoxybenzene-2-sulphonic acid. | P=blue red; S=scarlet. |
| 6 | 25.8 | 1-aminobenzene-2.5-disulphonic acid | P=red; S=red. |
| 7 | 21.2 | 1-amino-4-chlorobenzene-3-sulphonic acid. | P=brown red; S=red. |
| 8 | 27.0 | 4-amino-1.1'-diphenylether-3-sulphonic acid. | P=red; S=scarlet. |
| 9 | 25.8 | 1-aminobenzene-2.4-disulphonic acid. | P=red; S=red. |

*Example 4*

1 part of the dyestuff obtained according to example 1 is dissolved in a dyebath containing 3000 parts of water and 3 parts of sodium carbonate. 100 parts of cotton are entered at 40–50°, the bath is heated within 30 minutes to 90–95°, 45 parts of sodium sulphate are added and dyeing is performed for 60 minutes at this temperature. The goods are then rinsed with cold water and dried in the usual way. The cotton is dyed in brilliant scarlet shades which have good fastness to light.

What we claim is:

1. A disazo dyestuff of the general formula:

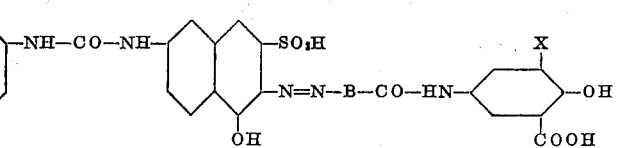

wherein A represents an aromatic radical selected from the group consisting of the benzene and naphthalene series, B represents an aromatic radical of the benzene series in which the bonds shown stand in other than the o-position of said aromatic residue and which is free from ionogenic substituents and groups capable of forming metal complexes, X represents a member selected from the group consisting of hydrogen, chlorine, methyl and sulphonic acid groups, n is an integer from 1 to 3 inclusive.

2. A disazo dyestuff of the general formula:

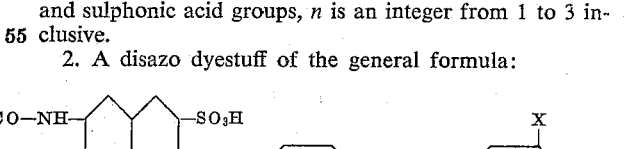

wherein A represents an aromatic radical selected from the group consisting of the benzene and naphthalene series, X represents a member selected from the group consisting of hydrogen, chlorine, methyl and sulphonic acid groups, Y represents a member selected from the group consisting of H, Cl and CH3, n is an integer from 1 to 3 inclusive.

3. A disazo dyestuff of the general formula:

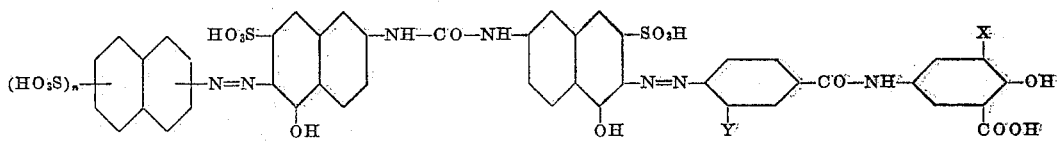

wherein X represents a member selected from the group consisting of hydrogen, chlorine, methyl and sulphonic acid groups, Y represents a member selected from the group consisting of H, Cl and CH₃, $n$ represents an integer from 1 to 3 inclusive.

4. A disazo dyestuff of the general formula:

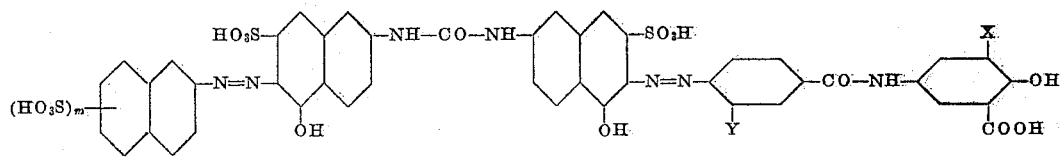

wherein X represents a member selected from the group consisting of hydrogen, chlorine, methyl and sulphonic acid groups, Y represents a member selected from the group consisting of H, Cl and CH₃, $m$ is an integer from 2 to 3 inclusive.

5. A disazo dyestuff of the formula:

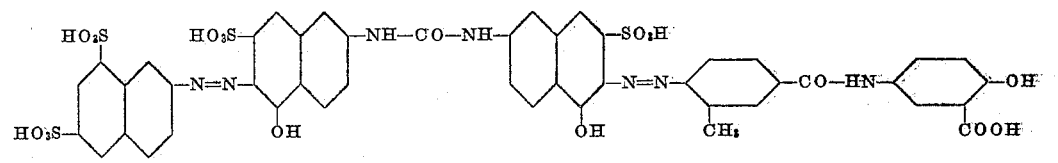

6. A disazo dyestuff of the formula:

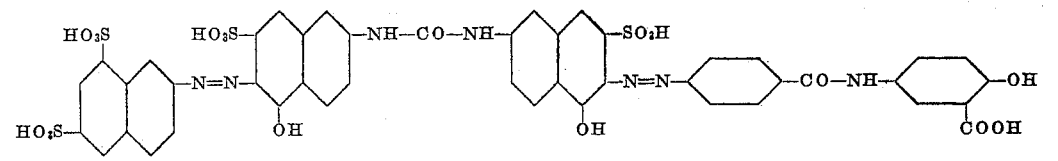

7. A disazo dyestuff of the formula:

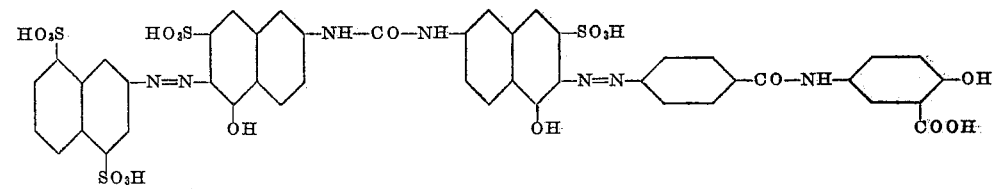

8. A disazo dyestuff of the formula:

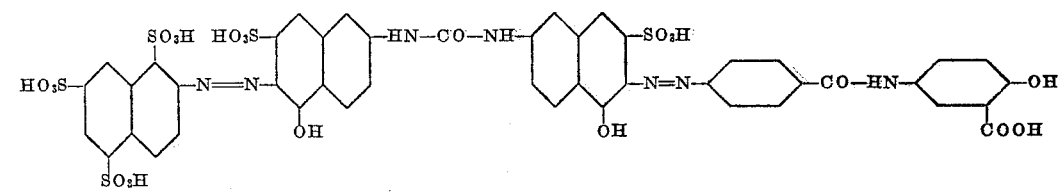

9. A disazo dyestuff of the formula:

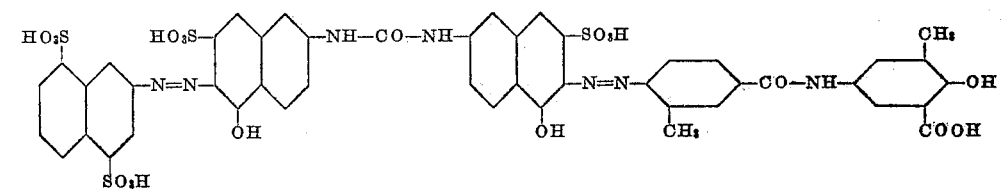

No references cited.